United States Patent
Jung et al.

(10) Patent No.: US 8,554,193 B2
(45) Date of Patent: Oct. 8, 2013

(54) APPARATUS FOR REPORTING AN EXCEPTION AND METHOD THEREOF

(75) Inventors: Jong Cheol Jung, Seoul (KR); Jin Sup Hong, Gwangmyeong-si (KR); Jae Woong Yun, Goyang-si (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 12/690,017

(22) Filed: Jan. 19, 2010

(65) Prior Publication Data

US 2011/0009111 A1   Jan. 13, 2011

(30) Foreign Application Priority Data

Jul. 7, 2009  (KR) .......................... 10-2009-0061698

(51) Int. Cl.
*H04M 3/00* (2006.01)

(52) U.S. Cl.
USPC ........... 455/419; 455/423; 455/424; 455/425; 714/36; 714/25; 714/31; 714/37; 714/38

(58) Field of Classification Search
USPC .................. 455/423, 424, 425, 419; 714/36, 714/25, 31, 37, 38
See application file for complete search history.

(56) References Cited

U.S. PATENT DOCUMENTS

| | | | |
|---|---|---|---|
| 6,502,208 B1 | 12/2002 | McLaughlin et al. | |
| 2003/0159088 A1* | 8/2003 | Phillips et al. | 714/38 |
| 2003/0163765 A1* | 8/2003 | Eckardt et al. | 714/36 |
| 2006/0075304 A1* | 4/2006 | Canning et al. | 714/38 |
| 2007/0083792 A1 | 4/2007 | McDermott et al. | |
| 2008/0162694 A1* | 7/2008 | Mamaghani et al. | 709/224 |
| 2009/0070630 A1* | 3/2009 | Khatri et al. | 714/37 |
| 2010/0093342 A1* | 4/2010 | Ramachandra Rao et al. | 455/432.1 |

FOREIGN PATENT DOCUMENTS

| | | |
|---|---|---|
| KR | 10-2007-0070562 | 7/2007 |
| KR | 10-2007-0071861 | 7/2007 |

OTHER PUBLICATIONS

E. Bott et al., "Troubleshooting Windows Errors," Windows Vista Inside Out Deluxe Edition, pp. 917-918, May 2008, XP-002593533.

* cited by examiner

*Primary Examiner* — Patrick Edouard
*Assistant Examiner* — Shantell L Heiber
(74) *Attorney, Agent, or Firm* — Lee, Hong, Degerman, Kang & Waimey

(57) ABSTRACT

A mobile terminal for reporting an exception or error and a method thereof, by which an exception of the mobile terminal can be transmitted to a server in a transmission mode appropriate for a status of a network. Exception information, such as information of a register of the mobile terminal if the exception is generated, information of a task performed by the mobile terminal before the generation of the exception, and history information before the generation of exception, are stored in a memory. The exception information is transmitted to the server.

7 Claims, 10 Drawing Sheets

APPARATUS FOR REPORTING AN EXCEPTION AND METHOD THEREOF

CROSS-REFERENCE TO RELATED APPLICATIONS

Pursuant to 35 U.S.C. §119(a), this application claims the benefit of earlier filing date and right of priority to Korean Application No. 10-2009-0061698, filed on Jul. 7, 2009, the contents of which are hereby incorporated by reference herein in their entirety.

FIELD OF THE INVENTION

The present invention relates to an apparatus for reporting an exception, or error, and a method thereof. Although the present invention is suitable for a wide scope of applications, it is particularly suitable for transmitting an exception of a mobile terminal to a server in a transmission mode appropriate for a status of a network.

DISCUSSION OF THE RELATED ART

Generally, to solve an error or an exception of a mobile terminal, a debugging program needs to be developed by establishing a database of the error or exception of the mobile terminal. A method of fixing the error or exception of the mobile terminal is necessary.

In order to establish the database of the error or exception, a method for reporting the error or exception of the mobile terminal to a sever is required. In an exception reporting method according to related art, a mobile terminal developer collects exceptions of software loaded in a mobile terminal in a manner such as a mobile terminal market survey, an after sales (A/S) center report from a user, or a report from a mobile terminal relevant Internet club. By using the collected information, an exception occurrence frequency or a seriousness of exception may be determined. Software is preferentially patched for an exception that requires an urgent correction. The patched software may upgrade a user terminal via an A/S center. Alternatively, automatic wireless upgrades are performed on user terminals using firmware over the air (FOTA).

According to the related art, the mobile terminal developer has difficulty collecting the error or exception information of the mobile terminals via various paths. It can also be inconvenient for users to report the exceptions by visiting the A/S center or logging onto the A/S center website. Moreover, it can take considerable time to register the error or exception of the mobile terminal with the A/S center.

SUMMARY OF THE INVENTION

Accordingly, the present invention is directed to an apparatus for reporting an exception (or error) and method thereof that substantially obviate one or more problems due to limitations and disadvantages of the related art.

As mentioned in the foregoing description, a procedure for reporting information on an error or exception of a mobile terminal is complicated and time-consuming. An object of the present invention is to provide an apparatus for reporting an exception (or error) and method thereof, by which information on an error or exception of a mobile terminal can be quickly transmitted to a server of a developer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one aspect, a method of reporting an exception of a mobile terminal includes storing register information in a memory of the mobile terminal when the exception is generated, storing information in the memory related to a task performed by the mobile terminal before the exception was generated, storing history information in the memory related to a sequence of inputs received by the mobile terminal before the exception was generated, rebooting the mobile terminal; and transmitting exception information to a server. The exception information includes at least the register information, the information related to the task or the history information.

In another aspect, a method of reporting an exception of a mobile terminal includes storing exception information in a memory when the exception is generated, and transmitting the exception information via a communication unit to a server according to a transmission mode of the mobile terminal. The transmission mode includes a lite mode in which the mobile terminal transmits small-scale information of the exception information or a full mode in which the mobile terminal transmits large-sale information of the exception information.

In a further aspect, a mobile terminal includes a control unit configured to control transmission of exception information according to a transmission mode of the mobile terminal when an exception is generated, a memory unit configured to store the exception information, and a communication unit configured to transmit the exception information to a server. The transmission mode includes one of a lite mode in which the mobile terminal is configured to transmit small-scale information of the exception information or a full mode in which the mobile terminal is configured to transmit large-sale information of the exception information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION

Reference will now be made of embodiments of the present invention, examples of which are illustrated in the accompanying drawings. The present invention can be implemented in various forms, which is not limited by the following embodiments. Wherever possible, the same reference numbers will be used throughout the drawings to refer to the same or like parts.

Throughout this disclosure, if a prescribed part 'includes' a prescribed element, it means that another element can be further included instead of eliminating other elements so long as there is no special objection. Moreover, terminology such as '~part,' '~functionality,' and '~module' can relate to a unit for handling at least one function or operation that can be implemented by software, hardware or a combination thereof.

In the following description, the suffixes 'module' and 'part' for elements are used to facilitate the preparation of this disclosure only. Significant meanings or roles are not given to the suffixes themselves. Hence, it is understood that the 'module' and 'part' can be used interchangeably.

A mobile terminal, as disclosed herein, can include a mobile phone, a smart phone, a notebook computer (laptop computer), a digital broadcast terminal, a PDA (personal digital assistants), a PMP (portable multimedia player), and/or a navigation system. It should be apparent to those skilled in the art that a configuration according to an embodiment disclosed in this specification should be applicable to fixed or stationary terminals, such as a digital TV or a desktop computer, except for applications disclosed to be specific only to a mobile terminal.

In an apparatus for reporting an error or exception and a method thereof, if an error or an exception is generated from a mobile terminal, the mobile terminal stores log information, is re-booted, and then transmits the log information to a server according to a mode of the mobile terminal. The mode of the mobile terminal includes a lite mode, a full mode and an adaptive mode.

Figure 1:
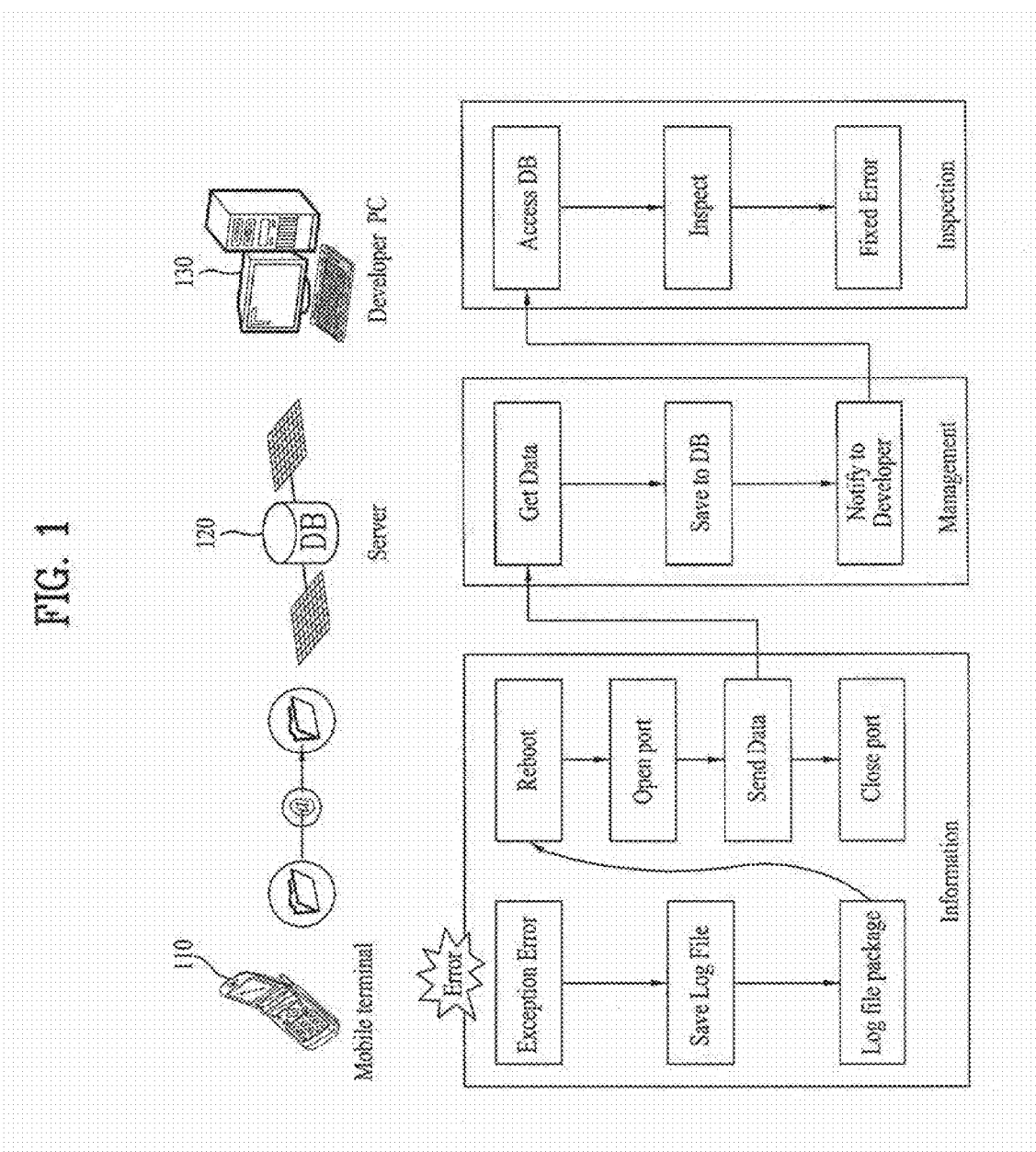
FIG. 1 is a block diagram for a configuration of an exception report system.

An exception report system is explained with reference to FIG. 1. FIG. 1 is a block diagram for a configuration of an exception report system. Referring to FIG. 1, an exception report system according to an embodiment of the present invention includes a mobile terminal 110, a server 120 and a developer PC 130.

If an error or exception is generated by the mobile terminal 110, the mobile terminal 110 stores log information, is re-booted, and then transmits the log information to the server 120. The log information includes task information and history information. The task information refers to the task performed by the mobile terminal before the error or exception is generated by the mobile terminal. The history information refers to the information indicating a sequence in pressing a keyboard or other input device, or the information indicating that an exception is generated by relevant application codes.

The mobile terminal 110 is able to transmit the log information to the server 120 in a lite mode or a full mode. In the lite mode, the mobile terminal 110 transmits small-scale information. In the full mode, the mobile terminal 110 transmits large-scale information.

The server 120 stores the information of the error or exception received from the mobile terminal 110 in a database. A developer can access the database of the server 120 via the developer PC 130 and check the information of the error or exception of the mobile terminal 110. The developer can develop a debugging program for correcting the error or exception and then transmit the debugging program to the mobile terminal 110 by wire or wirelessly.

Figure 2:
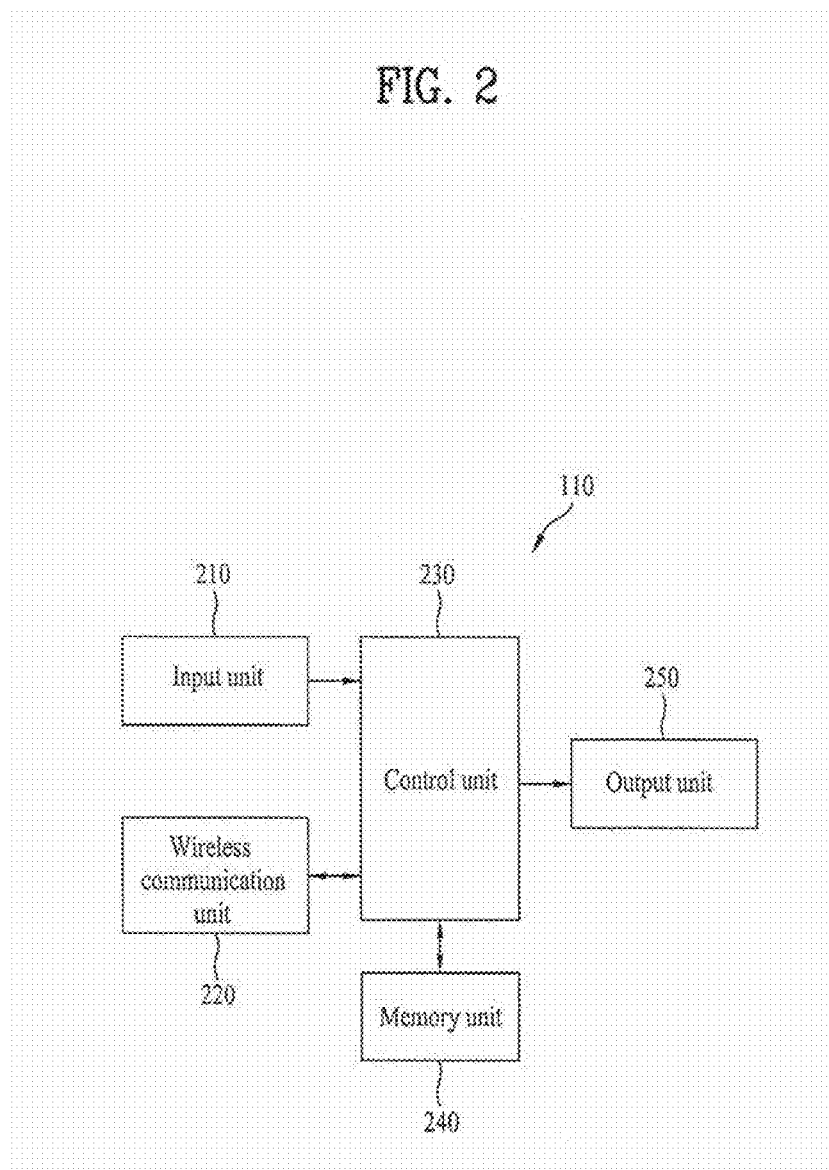
FIG. 2 is a block diagram of a terminal according to the present invention.

In the following description, a mobile terminal 110 is described with reference to FIG. 2. FIG. 2 is a block diagram of a mobile terminal 110. Referring to FIG. 2, the mobile terminal 110 includes an input unit 210, a wireless communication unit 220, a control unit 230, a memory unit 240 and an output unit 250.

The input unit 210 receives various inputs from a user and then delivers an input value to the control unit 230. The input value received from the user is related to enabling various functions of the mobile terminal 110 to be executed or is related to a parameter of the function. The input unit 210 can include a keypad, a dome switch, a touchpad (constant voltage/electrostatic), a jog wheel and/or a jog switch.

The wireless communication unit 220 exchanges data and speech information with peripheral devices by various methods including wire and wireless communications under the control of the control unit 230. In particular, the wireless communication unit 220 is configured to transmit exception information to the server 120.

The control unit 230 controls overall functions of the mobile terminal 110. For instance, the control unit 230 may control and process voice calls, a data communication, and/or video calls.

In particular, if an error or exception is generated, log information is stored in the memory unit 240 and an enable parameter is set to '1'. After the mobile terminal 110 has been rebooted, if the enable parameter is set to '1', the exception information is transmitted to the server 120 via the wireless communication unit 220.

The memory unit 240 stores programs for the processing and control of the control unit 230 and also stores temporary input/output data, such as phonebooks, messages, audio, still pictures, and moving pictures. The memory unit 240 stores a use frequency of each of the data as well. If an error or exception is generated by the mobile terminal, the memory unit 230 stores information related to the error or exception.

The memory unit 240 may include at least one type of a memory, such as SD memory or XD memory of a flash memory type, a hard disk type, a multimedia card micro type and a card type, a RAM (random access memory), an SRAM (static random access memory), a ROM (read only memory), an EEPROM (an electrically erasable programmable read-only memory), a PROM (programmable read-only memory), a magnetic memory, a magnetic disk and an optical disk.

The display unit 250 outputs information processed by the mobile terminal 110. In the course of performing various functions including an input procedure and/or an output procedure with a user, the display unit 250 provides the user with visual information. For instance, if the mobile terminal 110 is in a call mode, the display unit 250 displays a user interface (UI) or a graphic user interface (GUI) related to the call. If the mobile terminal 110 is in a video call mode or a photographing mode, the display unit 250 displays a photographed image, a received image, UI and/or GUI. The display unit 250 can include at least one of a liquid crystal display (LCD), a thin film transistor liquid crystal display (TFT LCD), an organic light emitting diode (OLED), a flexible display or a 3D display.

Figure 3:
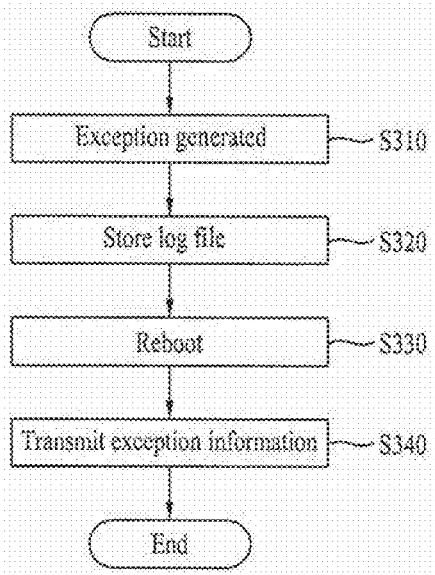
FIG. 3 is a flowchart for an exception reporting method according to the present invention.
Figure 4:
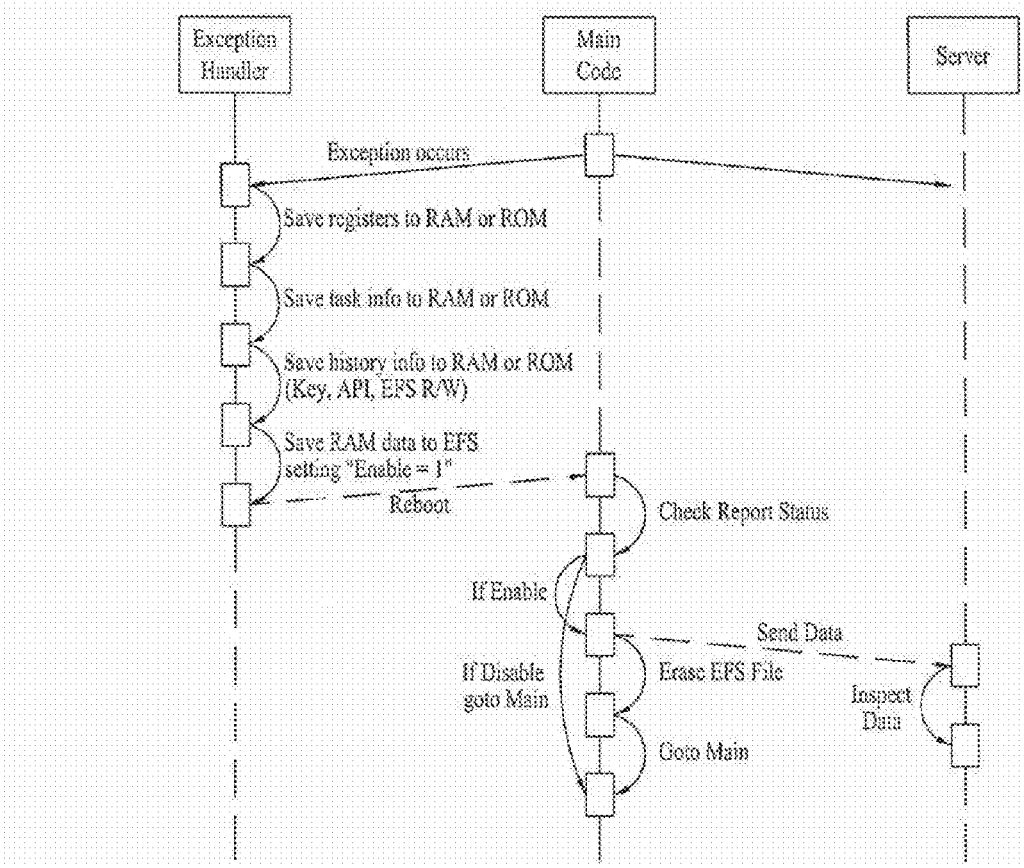
FIG. 4 is a flowchart for a flow of data by an exception reporting method according to the present invention.

In the following description, an exception reporting method is explained with reference to FIGS. 3 through 7. FIG. 3 is a flowchart for an exception reporting method and FIG. 4 is a flowchart for a flow of data by an exception reporting method.

Referring to FIG. 3, if an exception is generated by the mobile terminal 110 [S310], the mobile terminal stores a log file in the memory unit 240 [S320]. In FIG. 4, the mobile terminal 110 stores/saves information of a register in RAM or ROM. The mobile terminal 110 stores/saves task information and history information in a RAM or ROM.

The task information refers to the task performed by the mobile terminal 110 before the error or exception is generated by the mobile terminal 110. The history information refers to the information indicating a sequence in pressing a keyboard or utilizing another input device, the information indicating that an exception is generated from relevant application codes. For instance, a user may photograph an image using the mobile terminal 110. After the user has searched a phonebook for a recipient to whom to send the photographed image, if an exception is generated in the course of writing a message, the task information includes progress information of a camera task, a phonebook task and a message task and the history information includes information on a sequence in having a keyboard pressed by a user and information indicating that the exception is generated from camera, phonebook and message relevant application codes.

If the mobile terminal 110 is in a lite mode, information of a register, task information and history information are stored in a RAM. If the mobile terminal 110 is in a full mode, the information is stored in a ROM.

When the mobile terminal 110 is in the lite mode, since the mobile terminal transmits to the server only small-scale information among the information on the exception, it is only necessary to store the small-scale information. Therefore, the small-scale information can be stored in the RAM.

However, when the mobile terminal 110 is in the full mode, since the mobile terminal transmits to the server the large-scale information among the information on the exception, it is necessary to store the large-scale information. Therefore, the large-scale information is stored in an exception report system (hereinafter abbreviated 'ERS') of the ROM to save a space in the RAM.

Figure 5:
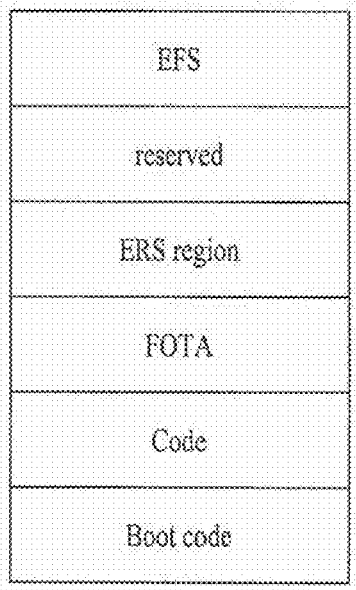
FIG. 5 is a diagram for a structure of ROM according to the present invention.

FIG. 5 is a diagram for a structure of a ROM. Referring to FIG. 5, a ROM can include an embedded file system (hereinafter abbreviated 'EFS'), an ERS region or a firmware over the air (FOTA) region. The EFS is a small-scale memory space for storing data of a phonebook. The ERS region is a space in which a terminal in full mode will store exception information.

In the lite mode, exception information amounts to no more than about 10 Kbytes. In the full mode, exception information will amount to up to about 5 Mbytes. Hence, it is difficult to store the exception information in the RAM in the full mode and a space for storing the exception information is necessary. Therefore, the exception information in the full mode is stored in the ERS region of the ROM.

If the mobile terminal 110 is rebooted, the information stored in the RAM is erased. Hence, the mobile terminal stores data of the RAM in the EFS. An enable parameter is then set to '1'. The enable parameter is a parameter for indicating whether a rebooting is a booting attributed to an exception after a mobile terminal 110 has been rebooted.

In particular, after the mobile terminal 110 has been rebooted, if the enable parameter is set to '1', the mobile terminal determines that it is rebooted due to the exception. If the enable parameter is set to '0', the mobile terminal 110 determines that it is not rebooted due to the exception.

Referring again to FIG. 3, after the mobile terminal 110 has been rebooted [S330], the mobile terminal transmits the exception information to the server 120 [S340].

In FIG. 4, the mobile terminal 110 checks the report status. If the enable parameter is set to '1,' the mobile terminal 110 transmits the exception information to the server 120, erases the exception information from the EFS, and then goes to a main image. If the enable parameter is set to '0', the mobile terminal 110 goes to the main image.

A method for a mobile terminal 110 to transmit exception information to a server 120 varies according to a mode of the mobile terminal. Modes of the mobile terminal 110 include a lite mode, a full mode and an adaptive mode. This is explained with reference to FIG. 6.

Figure 6:
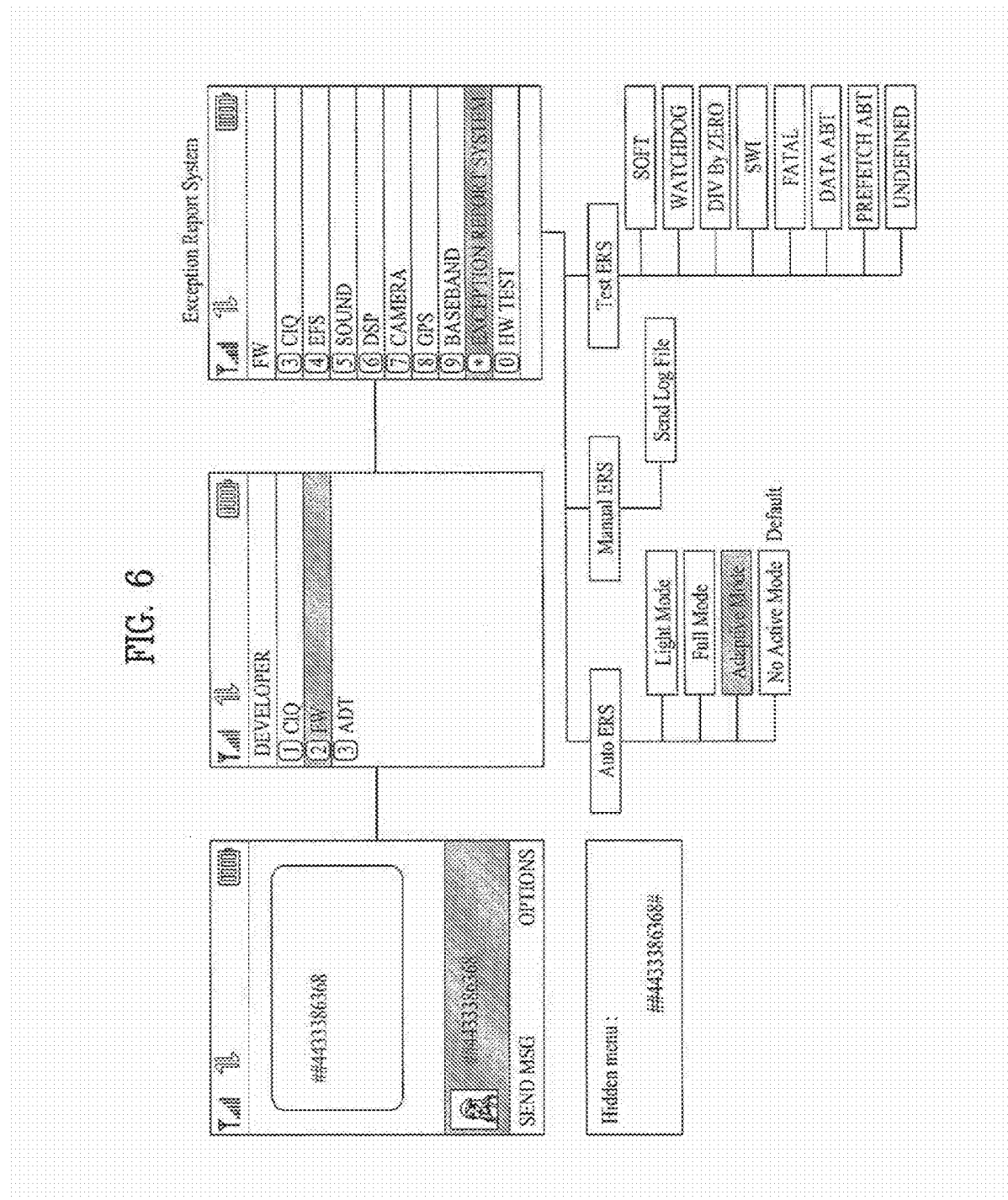
FIG. 6 is a diagram for a setting menu of an exception report system of a mobile terminal according to the present invention.

FIG. 6 is a diagram for a setting menu of an exception report system of a mobile terminal 110. Referring to FIG. 6, an exception report system of a mobile terminal 110 includes menus 'Auto ERS', 'Manual ERS' and 'Test ERS'.

The 'Auto ERS' menu is a menu for setting a transmission mode if the mobile terminal 110 automatically transmits information on the menu. The 'Manual ERS' menu is a menu for a user to manually transmit the information on the menu to the server 120. The 'Test ERS' menu is a menu for testing the exception report system.

The transmission menu settable in the 'Auto ERS' menu can include one of a lite mode, a full mode, an adaptive mode or a no-active mode. The lite mode is primarily a mode that is utilizable in an initial verifying step and for transmitting an exception in real time. Since small-scale information is transmitted, the lite mode is advantageous in that a developer is able to quickly analyze an exception. When in the lite mode, a size of the exception information is a maximum of about 10 Kbytes and a transmission time for the exception information is about 10 seconds.

The full mode is primarily a mode that is utilizable in an intensive verifying step and for transmitting an exception in real time. Since large-scale information is transmitted, the full mode is advantageous in that a developer is able to precisely analyze the exception. When in the full mode, a size of the exception information is a maximum of about 50 Mbytes and a transmission time for the exception information is about 5 minutes. Yet, the full mode is disadvantageous in that it requires a large storage space.

The adaptive mode is a transmission mode for a mobile terminal 110 to operate in the lite mode or the full mode according to the status of a network. In the adaptive mode, if a status of the network is not good and a data rate is low, the mobile terminal 110 operates in the lite mode. In the adaptive mode, if a status of the network is good and a data rate is high, the mobile terminal 110 is able to operate in the full mode.

For instance, if a data rate of a network is equal to or higher than a preset reference, the mobile terminal 110 operates in the full mode. If the data rate of the network is lower than the preset reference, the mobile terminal 110 operates in the lite mode.

The no-active mode refers to a mode in which the exception report system does not operate.

The 'Send Log File' submenu of the 'Manual ERS' menu allows a user to manually transmit exception information to the server 120. If the mobile terminal 110 automatically transmits exception information, the mobile terminal attempts to transmit exception information as many times as set in a preset count. If the attempt fails, the mobile terminal 110 does not transmit the exception information. A user is able to transmit the exception information to the server 120 manually using the 'Send Log File' submenu.

Figure 7:
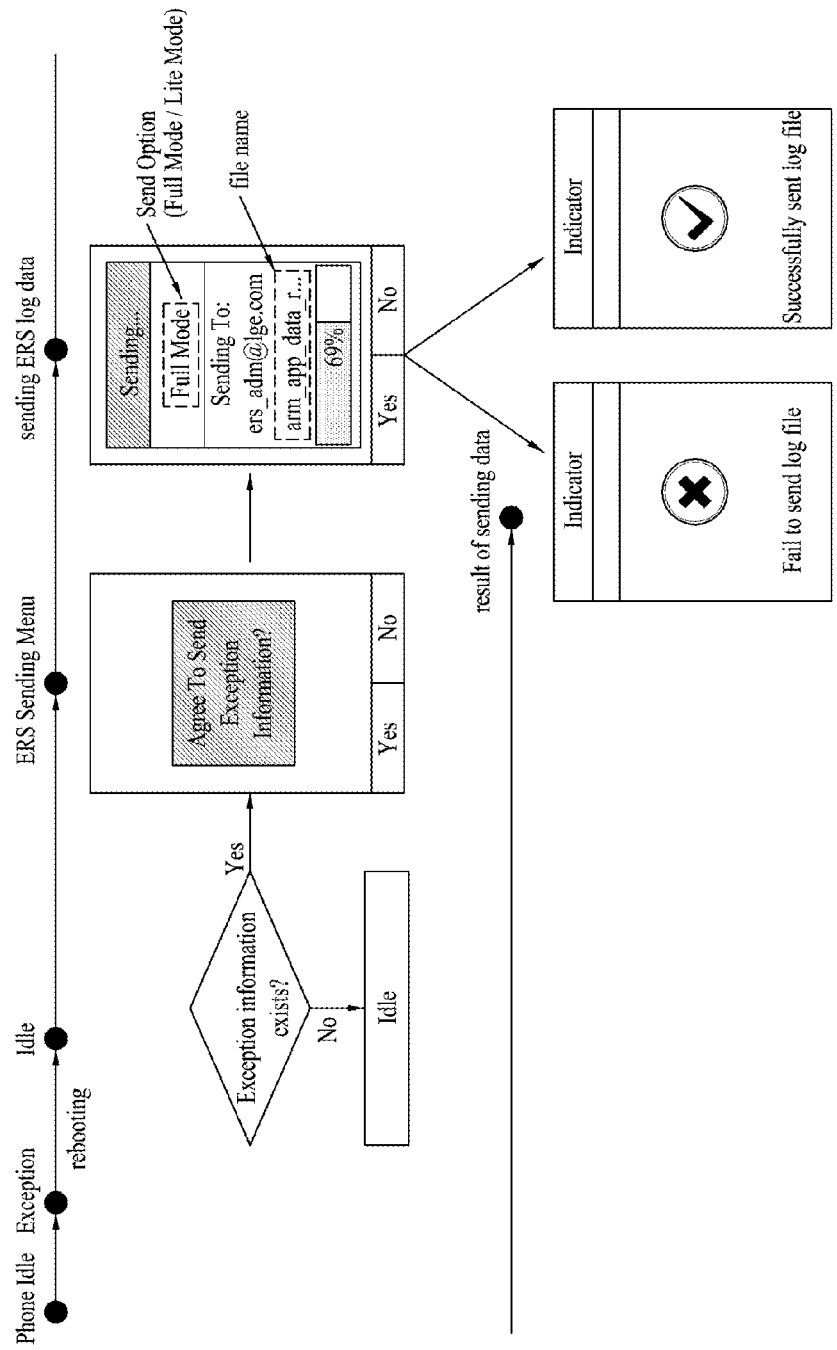
FIG. 7 is a diagram of a process for transmitting exception information to a server from a mobile terminal according to the present invention.

FIG. 7 is a diagram of a user interface (UI) when the mobile terminal 110 transmits exception or error information. Referring to FIG. 7, if exception information exists, the mobile terminal 110 displays a message querying 'Agree to send exception information?'. If a user selects 'Yes', the mobile terminal 110 displays a transmission image. The transmission image shows a transmission mode (send option), a recipient email and a name of a file that is being transmitted. After the transmission has ended, the mobile terminal 110 displays an indicator image indicating whether the transmission was successful or failed.

Figure 8:
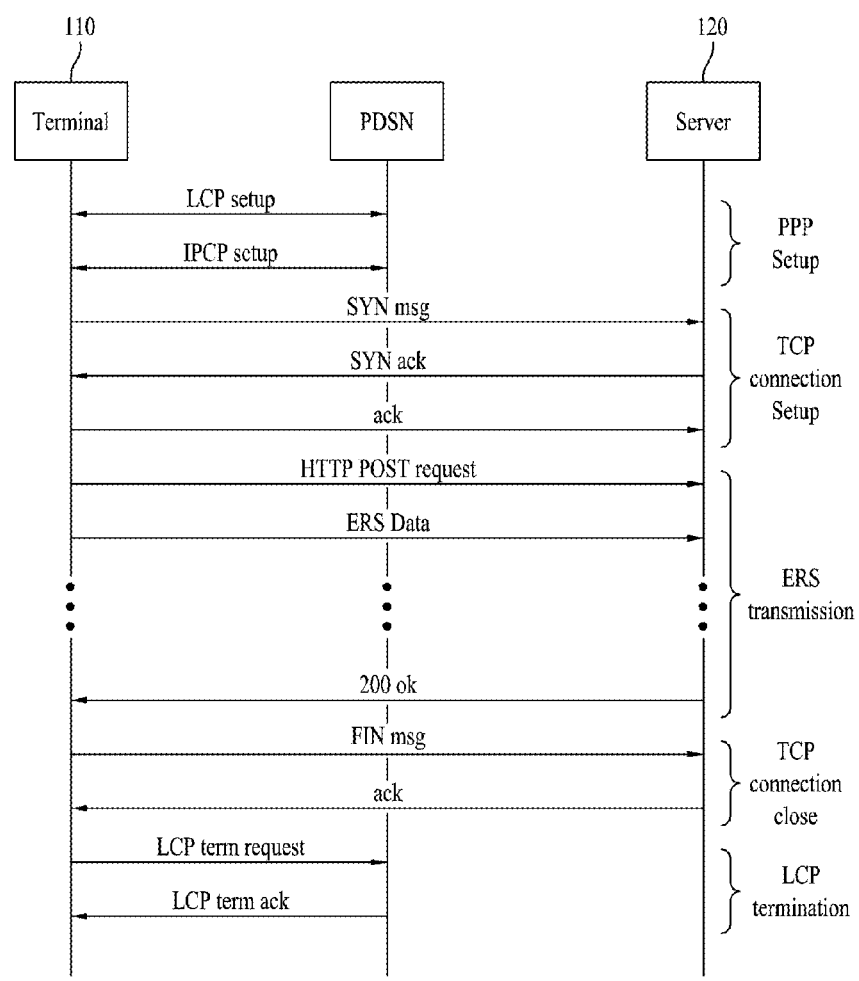
FIG. 8 is a diagram of a process for transmitting exception information to a server from a mobile terminal according to the present invention.

FIG. 8 is a diagram of a process for transmitting exception information to the server 120 from the mobile terminal 110. Referring to FIG. 8, the mobile terminal 110 sets a packet data serving node (hereinafter abbreviated 'PDSN') and a point to point protocol (hereinafter abbreviated 'PPP') and then establishes a transmission control protocol (hereinafter abbreviated 'TCP') connection to the server 120.

Subsequently, the mobile terminal 110 sends a hypertext transfer protocol (hereinafter abbreviated HTTP) POST request and exception information to the server 120 and then receives an acknowledgement message from the server indicating receipt of the exception information. The mobile terminal 110 closes the TCP connection to the server 120 and then terminates a link control protocol (hereinafter abbreviated 'LCP') with the PDSN.

Figure 9:
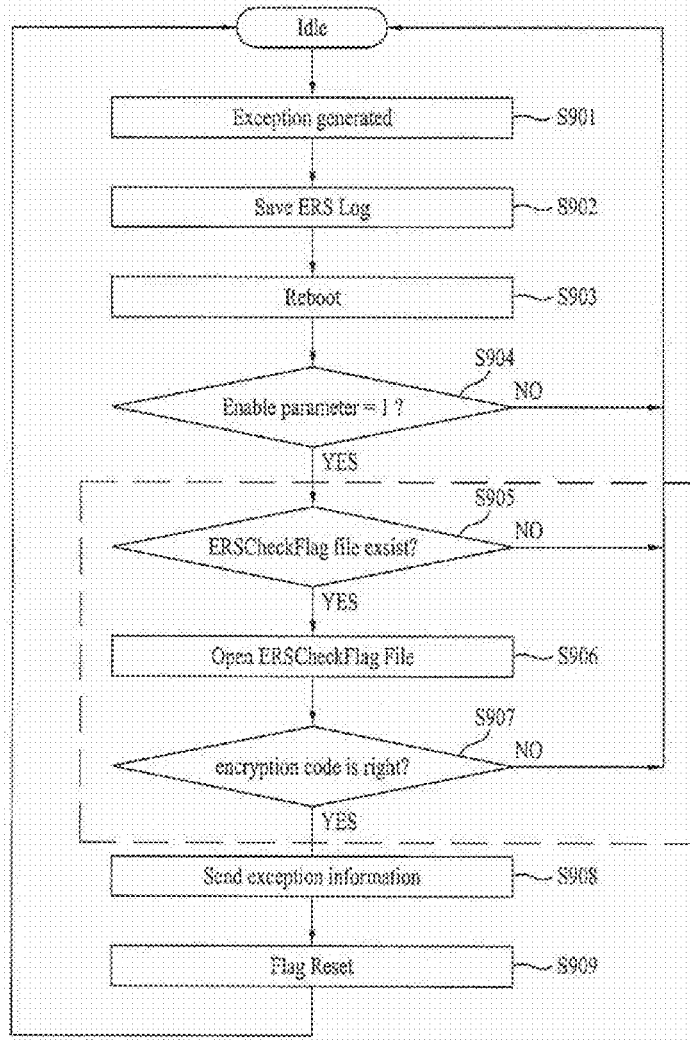
FIG. 9 is a flowchart of an exception reporting method according to the present invention.

In the following description, an exception reporting method is explained with reference to FIG. 9. FIG. 9 is a flowchart of an exception reporting method.

Referring to FIG. 9, if an exception is generated by the mobile terminal 110 [S901], the mobile terminal stores/saves an ERS log file in the memory unit 240 [S902]. Step S902 is performed in the same manner as former step S320 in FIG. 3.

After the mobile terminal 110 has been rebooted [S903], if the enable parameter is set to '0,' the mobile terminal goes to an idle state [S904]. If the enable parameter is set to '1' [S904], the mobile terminal 110 checks whether an ERS check flag file (ERSCheckFlag File) exists [S905].

Figure 10:
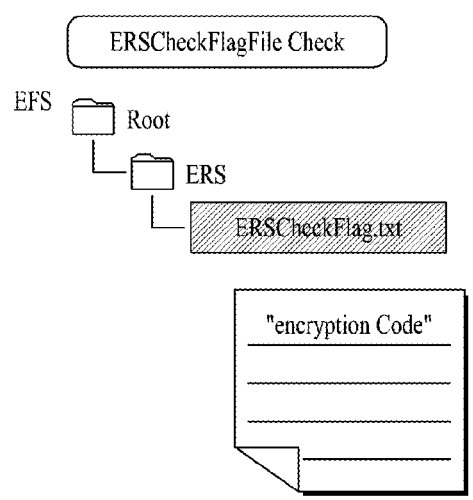
FIG. 10 is a diagram of an ERS check flag file according to the present invention.

FIG. 10 is a diagram of an ERS check flag file check. An ERS check flag file is a file indicating whether the mobile terminal 110 performs an ERS function. If the mobile terminal 110 stores the ERS check flag file, the mobile terminal performs the ERS function. If the mobile terminal 110 does not store the ERS check flag file, the mobile terminal does not perform the ERS function.

Referring to FIG. 10, an ERS check flag file includes an encryption code, which is to identify an ERS check flag file stored by hacking In particular, when a hacker enables an ERS check flag file to be stored in the mobile terminal 110, the encryption code helps prevent an ERS function from being executed.

If the ERS check flag file exists, the mobile terminal 110 opens the ERS check flag file [S906] and then checks the encryption code [S907]. If the encryption code is correct, the mobile terminal 110 sends/transmits exception information [S908] and resets the enable parameter (flag reset) [S909].

Figure 11:
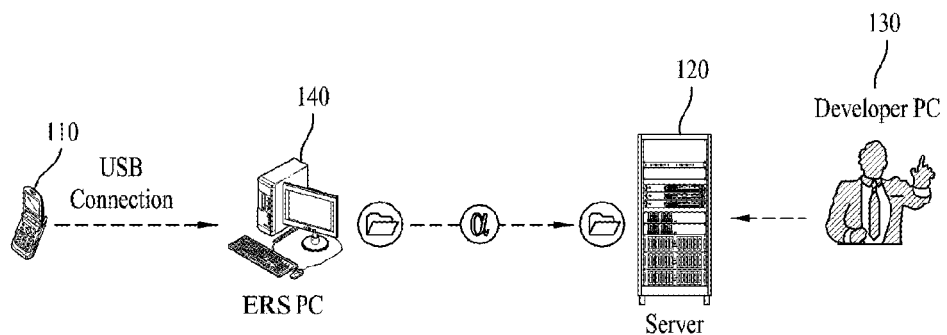
FIG. 11 is a diagram of an exception report system according to the present invention.

In the following description, an exception reporting method is explained with reference to FIG. 11. FIG. 11 is a diagram of an exception report system. Referring to FIG. 11, an exception report system includes a mobile terminal 110, a server 120, a developer PC 130 and an ERS PC 140.

As described above, the mobile terminal 110 transmits the exception information to the server 120 wirelessly. Alternatively, referring to FIG. 11, exception information of the mobile terminal 110 is transmitted to the ERS PC 140. The ERS PC 140 then transmits the exception information to the server 120 by wire. Since an ERS tool is stored in the ERS PC 140, the ERS PC receives the exception information from the mobile terminal 110 and then transmits the exception information to the server 120 using the ERS tool.

The mobile terminal 110 and the ERS PC 140 can be connected to each other by USB. Once the mobile terminal 110 is connected to the ERS PC 140, the ERS tool is able to load ERS log information of the mobile terminal 110 and model information of the mobile terminal. By checking a presence or non-presence of the exception information, the exception information is transmitted to the server 120.

Embodiments of the present invention can be implemented using various means. For instance, embodiments of the present invention can be implemented using hardware, firmware, software and/or any combinations thereof. In the implementation by hardware, a random access method according to one embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller or microprocessor.

If the implementation is by firmware or software, an exception reporting method and apparatus can be implemented by modules, procedures, and/or functions for performing the above-explained functions or operations. Software code is stored in a memory unit and is then drivable by a processor. The memory unit is provided within or outside the processor to exchange data with the processor through the various means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

According to an embodiment of the present invention, information on an error or exception of a mobile terminal can be quickly transmitted to a sever of a developer. The information on the error or exception can be transmitted to the server in an appropriate transmission mode according to a network status.

Effects obtainable from the present invention are non-limited by the above-mentioned effects. It will be apparent to those skilled in the art that other undisclosed effects are clearly understandable from the following description.

What is claimed is:

1. A method of reporting an exception of a mobile terminal, the method comprising:

storing exception information generated by the mobile terminal in a memory of the mobile terminal when the exception of the mobile terminal is generated;

rebooting the mobile terminal after the storing of the exception information;

transmitting the stored exception information, via a communication unit of the mobile terminal, to a server based on a transmission mode of the mobile terminal after the rebooting of the mobile terminal, the transmission mode comprising a lite mode in which the mobile terminal transmits small-scale information of the stored exception information, a full mode in which the mobile terminal transmits large-scale information of the stored exception information, or an adaptive mode in which the mobile terminal operates in either the lite mode or the full mode based on a status of a network;

operating the mobile terminal in the lite mode when a data rate of the network is lower than a predetermined reference; and operating the mobile terminal in the full mode when the data rate of the network is equal to or higher than the predetermined reference, wherein the exception information includes task information related to a task performed by the mobile terminal before the exception was generated and history information related to information indicating that the exception is generated by relevant application codes before the exception was generated.

2. The method of claim 1, wherein transmitting the stored exception information comprises transmitting the stored exception information to the server when the mobile terminal stores an exception report system (ERS) check flag file and an encryption code of the ERS check flag file is correct.

3. A mobile terminal, comprising:
a memory unit;
a control unit configured to generate exception information related to an exception generated by the mobile terminal when the exception of the mobile terminal is generated, cause storing of the exception information in the memory unit, reboot the mobile terminal after the storing of the exception information, and cause transmission of the exception information based on a transmission mode of the mobile terminal; and
a communication unit configured to transmit the stored exception information to a server after the rebooting of the mobile terminal,
wherein the transmission mode comprises a lite mode in which the mobile terminal is configured to transmit small-scale information of the stored exception information, a full mode in which the mobile terminal is configured to transmit large-scale information of the stored exception information, or an adaptive mode in which the mobile terminal is configured to operate in either the lite mode or the full mode based on a status of a network, wherein the mobile terminal is configured to operate in the lite mode when a data rate of the network is lower than a predetermined reference, wherein the mobile terminal is configured to operate in the full mode when the data rate of the network is equal to or higher than the predetermined reference, and wherein the exception information includes task information related to a task performed by the mobile terminal before the exception was generated and history information related to information indicating that the exception is generated by relevant application codes before the exception was generated.

4. The terminal of claim 3, wherein:
the memory unit comprises a random access memory (RAM); and
the control unit is further configured to control storing of the exception information in the RAM when the mobile terminal operates in the lite mode.

5. The terminal of claim 3, wherein:
the memory unit comprises a read-only memory (ROM); and
the control unit is further configured to control storing of the exception information in an embedded file system (EFS) region of the ROM.

6. The terminal of claim 3, wherein:
the memory unit comprises an exception report system (ERS) region of a read-only memory (ROM); and
the control unit is further configured to control storing of the exception information in the ERS region of the ROM when the mobile terminal operates in the full mode.

7. The terminal of claim 3, wherein:
the memory unit is further configured to store an exception report system (ERS) check flag file indicating whether the mobile terminal performs an ERS function and an encryption code of the ERS check flag file is correct, and
the control unit is further configured to perform the ERS function when the encryption code of the ERS check flag file is correct.

* * * * *